US012361519B2

(12) United States Patent
Martin Brualla et al.

(10) Patent No.: US 12,361,519 B2
(45) Date of Patent: Jul. 15, 2025

(54) NEURAL BLENDING FOR NOVEL VIEW SYNTHESIS

(71) Applicant: GOOGLE LLC, Mountain View, CA (US)

(72) Inventors: Ricardo Martin Brualla, Seattle, WA (US); Daniel Goldman, Seattle, WA (US); Hugues Herve Hoppe, Mercer Island, WA (US); Lynn Tsai, Seattle, WA (US); Lars Peter Johannes Hedman, London (GB)

(73) Assignee: GOOGLE LLC, Mountain View, CA (US)

( * ) Notice: Subject to any disclaimer, the term of this patent is extended or adjusted under 35 U.S.C. 154(b) by 190 days.

(21) Appl. No.: 17/754,392

(22) PCT Filed: Apr. 8, 2021

(86) PCT No.: PCT/US2021/070362
§ 371 (c)(1),
(2) Date: Mar. 31, 2022

(87) PCT Pub. No.: WO2022/216333
PCT Pub. Date: Oct. 13, 2022

(65) Prior Publication Data
US 2022/0398705 A1 Dec. 15, 2022

(51) Int. Cl.
*G06T 5/50* (2006.01)
*G06T 3/18* (2024.01)
(Continued)

(52) U.S. Cl.
CPC .................. *G06T 5/50* (2013.01); *G06T 3/18* (2024.01); *G06T 5/70* (2024.01); *G06T 5/80* (2024.01);
(Continued)

(58) Field of Classification Search
None
See application file for complete search history.

(56) References Cited

U.S. PATENT DOCUMENTS 7,965,902 B1 * 6/2011 Zelinka .................. G06F 16/51
382/284
9,214,040 B2   12/2015 Smolic et al.
(Continued)

FOREIGN PATENT DOCUMENTS

CN   110602476 A   12/2019
CN   112541972 A   3/2021
(Continued)

OTHER PUBLICATIONS

Hedman et al., "Deep Blending for Free-Viewpoint Image-Based Rendering", (Year: 2018).*
(Continued)

*Primary Examiner* — Hilina K Demeter
(74) *Attorney, Agent, or Firm* — Brake Hughes Bellermann LLP

(57) ABSTRACT

Systems and methods are described for receiving a plurality of input images, a plurality of depth images, and a plurality of view parameters for generating a virtual view of a target subject. The systems and methods may generate a plurality of warped images based on the plurality of input images, the plurality of view parameters, and at least one of the plurality of depth images. In response to providing the plurality of depth images, the plurality of view parameters, and the plurality of warped images to a neural network, the systems and methods may receive, from the neural network, blending weights for assigning color to pixels of the virtual view of the target subject and may generate, based on the blending weights and the virtual view, a synthesized image according to the view parameters.

18 Claims, 7 Drawing Sheets

(51) Int. Cl.
    *G06T 5/70*     (2024.01)
    *G06T 5/80*     (2024.01)
    *G06T 7/55*     (2017.01)
    *G06T 15/20*     (2011.01)

(52) U.S. Cl.
    CPC ............... *G06T 7/55* (2017.01); *G06T 15/20* (2013.01); *G06T 2207/10016* (2013.01); *G06T 2207/10024* (2013.01); *G06T 2207/10028* (2013.01); *G06T 2207/20016* (2013.01); *G06T 2207/20084* (2013.01); *G06T 2207/20221* (2013.01); *G06T 2207/30201* (2013.01)

(56) References Cited

U.S. PATENT DOCUMENTS

| | | | |
|---|---|---|---|
| 10,679,046 | B1 | 6/2020 | Black et al. |
| 10,970,911 | B2 | 4/2021 | Schied et al. |
| 2011/0142289 | A1* | 6/2011 | Barenbrug ............. G06T 7/136 382/107 |
| 2012/0237137 | A1* | 9/2012 | Chen ..................... G06T 5/50 382/284 |
| 2014/0160239 | A1 | 6/2014 | Tian |
| 2018/0014003 | A1 | 1/2018 | Grover et al. |
| 2019/0304164 | A1* | 10/2019 | Zhang ..................... G06T 1/20 |
| 2020/0226816 | A1 | 7/2020 | Kar et al. |
| 2020/0228774 | A1* | 7/2020 | Kar ..................... G06T 15/08 |
| 2020/0320747 | A1* | 10/2020 | Izumi ..................... G06T 3/00 |
| 2021/0012576 | A1* | 1/2021 | Riegler ................. G06N 3/08 |
| 2021/0097346 | A1* | 4/2021 | Tremblay ............... G06T 15/50 |
| 2021/0281814 | A1* | 9/2021 | Guizilini ................ H04N 23/60 |
| 2021/0358146 | A1* | 11/2021 | Kim ..................... G06T 7/507 |
| 2022/0156886 | A1* | 5/2022 | Petrangeli ............. G06T 3/606 |
| 2022/0215617 | A1 | 7/2022 | Song et al. |

FOREIGN PATENT DOCUMENTS

| | | |
|---|---|---|
| CN | 112614060 A | 4/2021 |
| CN | 108510573 B | 7/2021 |
| JP | 2012504805 A | 2/2012 |
| JP | 2018503066 A | 2/2018 |
| TW | 202040505 A | 11/2020 |

OTHER PUBLICATIONS

International Search Report and Written Opinion for PCT Application No. PCT/US2021/070362, mailed on Dec. 21, 2021, 16 pages.
Guo, et al., "Accurate Light Field Depth Estimation via an Occlusion-Aware Network", IEEE International Conference on Multimedia and Expo (ICME), 2020, 6 Pages.
Hedman, et al., "Deep Blending for Free-Viewpoint Image-Based Rendering", ACM Transactions on Graphics, Nov. 2018, 15 pages.
Hedman, et al., "Scalable Inside-Out Image-Based Rendering", ACM Transactions on Graphics, ACM, vol. 35 No. 6, Nov. 11, 2016, 11 Pages.
Park, et al., "LatentFusion: End-to-End Differentiable Reconstruction and Rendering for Unseen Object Pose Estimation", arXiv.org (https://arxiv.org/abs/1912.00416), Dec. 1, 2019, 10 pages.
Riegler, et al., "Free View Synthesis", arXiv.org (https://arxiv.org/abs/2008.05511), Aug. 12, 2020, 17 pages.
Schops, et al., "A Multi-View Stereo Benchmark With High-Resolution Images and Multi-Camera Videos", IEEE Conference on Computer Vision and Pattern Recognition (CVPR), IEEE Computer Society, 2017, 10 Pages.
Thies, et al., "Image-Guided Neural Object Rendering", ICLR 2020 Conference, Jan. 15, 2020, 16 pages.
Yang, et al., "High-Resolution Image Inpainting using Multi-Scale Neural Patch Synthesis", arXiv.org (https://arxiv.org/abs/1611.09969), Apr. 13, 2017, 9 pages.

* cited by examiner

NEURAL BLENDING FOR NOVEL VIEW SYNTHESIS

CROSS REFERENCE TO RELATED APPLICATION

This application is a 35 U.S.C. § 371 National Phase Entry Application from PCT/US2021/070362, filed Apr. 8, 2021, designating the U.S., the disclosure of which is incorporated herein by reference in its entirety.

TECHNICAL FIELD

This description generally relates to methods, devices, and algorithms used in synthesizing three-dimensional (3D) content.

BACKGROUND

Conventional object rendering generally includes intensive computational effort in order to generate realistic imagery. If the objects are in motion, additional computational effort may be used to generate realistic images of the objects. Such rendering can include the use of neural networks to model appearances of objects. However, the models may generate images with extraneous noise and geometric artifacts.

SUMMARY

The systems and methods described herein may perform image-based rendering using input images and predefined view parameters to generate (e.g., synthesize) novel (e.g., unseen) views of video and/or images based on the input images. Image-based rendering of unseen views can utilize a warping process for received input images. In general, the warping process can cause geometric inaccuracies and view and/or image-dependent effects that may produce artifacts when contributions from different input views are blended together. The systems and methods described herein use a deep learning technique that employs neural networks (NNs) to blend image content for image-based rendering of novel views. Particular blend weights are learned and used to combine input image contributions to a final synthesized view. The blend weights are generated to provide the advantage of generating synthesized images that exhibit reduced view and/or image-dependent effects and a reduced number of image artifacts.

A technical challenge that may arise when using NNs, warping processes, and/or blend weights is a lack of sufficiently accurate geometry so that the NN (e.g., a convolutional neural network) can select appropriate blending weights in order to avoid image artifacts. The systems and methods described herein may solve this technical challenge by using a learned blending of color and depth views of input images and/or employing multiresolution blending techniques to select pixel colors that provide accurate images with reduced image artifacts. For example, the blending weights may be applied to heavily weight projected (e.g., probabilistically provided) pixel colors that are likely to be correct and accurate with respect to a ground truth image while deemphasizing the weight of projected pixel colors that are less likely to be correct and/or accurate for the given ground truth image.

To employ such blending techniques, the systems and methods described herein may utilize one or more witness camera(s) in addition to particular onboard system cameras (e.g., color cameras, infrared cameras, etc.). The witness camera(s) may supervise the content used to generate the novel views. For example, the witness camera(s) may be a high resolution camera that may function to provide ground truth data. The generated novel view is compared with the ground truth data received from (e.g., captured by) the witness camera(s). In some implementations, image details of the novel view can be scored based on image details captured by the witness camera(s) when generating the novel views.

In some implementations, the systems and methods described herein take into account training losses. For example, the systems can generate training data with a variety of captured scenes to minimize loss in order to provide high quality novel view synthesis, while reducing temporal flickering artifacts in the synthesized views. In some implementations, the systems and methods described herein may also employ occlusion reasoning to correct for artifacts in the synthesized novel views.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, systems and methods are described for receiving a plurality of input images, receiving a plurality of depth images associated with a target subject in at least one of the plurality of input images, receiving a plurality of view parameters for generating a virtual view of the target subject, and generating a plurality of warped images based on the plurality of input images, the plurality of view parameters, and at least one of the plurality of depth images. In response to providing the plurality of depth images, the plurality of view parameters, and the plurality of warped images to a neural network, the systems and methods may receive, from the neural network, blending weights for assigning color to pixels of the virtual view of the target subject. The systems and methods may generate based on the blending weights and the virtual view, a synthesized image according to the view parameters.

These and other aspects can include one or more of the following, alone or in combination. In some implementations, the systems and methods may include reconstructing a consensus surface using a geometric fusion process on the plurality of depth images to generate a geometrically fused model, generating a plurality of reprojected images based on the plurality of input images and the consensus surface, and in response to providing the plurality of depth images, the plurality of view parameters, and the plurality of reprojected images to the neural network, the systems and methods may receive, from the neural network, additional blending weights for assigning color to pixels in the synthesized image.

In some implementations, the systems and methods may further comprise providing, to the neural network, a difference in depth between the geometrically fused model and a depth observed in the plurality of depth images, and the method further comprising correcting for detected occlusions in the synthesized image based on the difference in depth. In some implementations, the plurality of input images are color images captured according to predefined view parameters associated with at least one camera that captured the plurality of input images and/or the plurality of depth images each including a depth map associated with at least one camera that captured at least one of the plurality of input images, at least one occlusion map, and/or a depth map associated with a ground truth image captured by at least one witness camera at a time corresponding to capture of at least one of the plurality of input images. In some implementations, the blending weights are configured to assign a blended color to each pixel of the synthesized image.

In some implementations, the neural network is trained based on minimizing an occlusion loss function between the synthesized image generated by the neural network and a ground truth image captured by at least one witness camera. In some implementations, the synthesized image is an uncaptured view of the target subject generated for a three-dimensional video conference.

In some implementations, generating the plurality of warped images based on the plurality of input images, the plurality of view parameters, and at least one of the plurality of depth images includes determining candidate projections of colors associated with the plurality of input images into an uncaptured view using the at least one of the plurality of depth images where the uncaptured view includes at least a portion of image features of at least one of the plurality of input images.

In another general aspect, an image processing system is described, in particular for carrying out the method as claimed in any of the preceding claims. The image processing system may comprise at least one processing device and a memory storing instructions that when executed cause the system to perform operations including receiving a plurality of input images captured by the image processing system, receiving a plurality of depth images captured by the image processing system, receiving a plurality of view parameters associated with an uncaptured view associated with at least one of the plurality of input images, and generating a plurality of warped images based on the plurality of input images, the plurality of view parameters, and at least one of the plurality of depth images. In response to providing the plurality of depth images, the plurality of view parameters, and the plurality of warped images to a neural network, the system may include receiving, from the neural network, blending weights for assigning color to pixels of the uncaptured view. The system may further include generating a synthesized image according to the blending weights, wherein the synthesized image corresponds to the uncaptured view.

These and other aspects can include one or more of the following, alone or in combination. In some implementations, the plurality of input images are color images captured by the image processing system according to predefined view parameters associated with the image processing system and/or the plurality of depth images including a depth map associated with at least one camera that captured at least one of the plurality of input images, at least one occlusion map, and/or a depth map associated with a witness camera of the image processing system.

In some implementations, the blending weights are configured to assign a blended color to each pixel of the synthesized image. In some implementations, the neural network is trained based on minimizing an occlusion loss function between the synthesized image generated by the neural network and a ground truth image captured by at least one witness camera. In some implementations, the synthesized image is a novel view generated for a three-dimensional video conference.

In another general aspect, a non-transitory, machine-readable medium is described as having instructions stored thereon, the instructions, when executed by a processor, cause a computing device to receive a plurality of input images, receive a plurality of depth images associated with a target subject in at least one of the plurality of input images, and receive a plurality of view parameters for generating a virtual view of the target subject. The machine-readable medium may also be configured to reconstruct a consensus surface using a geometric fusion process on the plurality of depth images to generate a geometrically fused model of the target subject, generate a plurality of reprojected images based on the plurality of input, the plurality of view parameters, and the consensus surface. In response to providing the plurality of depth images, the plurality of view parameters, and the plurality of reprojected images to a neural network, the machine-readable medium may receive, from the neural network, blending weights for assigning color to pixels to the virtual view of the target subject, and generate, based on the blending weights and the virtual view, a synthesized image according to the view parameters.

These and other aspects can include one or more of the following, alone or in combination. In some implementations, the machine-readable medium further comprises providing, to the neural network, a difference in depth between the geometrically fused model and a depth observed in the plurality of depth images and correcting for detected occlusions in the synthesized image based on the difference in depth. In some implementations, the plurality of input images are color images captured according to predefined view parameters associated with at least one camera that captured the plurality of input images and/or the plurality of depth images include a depth map associated with at least one camera that captured at least one of the plurality of input images, at least one occlusion map, and/or a depth map associated with a ground truth image captured by at least one witness camera at a time corresponding to capture of at least one of the plurality of input images.

In some implementations, the blending weights are configured to assign a blended color to each pixel of the synthesized image. In some implementations, the neural network is trained based on minimizing an occlusion loss function between the synthesized image generated by the neural network and a ground truth image captured by at least one witness camera. In some implementations, the synthesized image is a novel view for a three-dimensional video conference. In some implementations, the neural network is further configured to perform multiresolution blending to assign pixel color to pixels in the synthesized image, the multiresolution blending triggering provision of image pyramids as input to the neural network to trigger receiving, from the neural network, multiresolution blending weights for a plurality of scales and an opacity value associated with each scale.

These and other aspects can include one or more of the following, alone or in combination. According to some aspects, the methods, systems, and computer-readable mediums claimed herein may include one or more (e.g., all) of the following features (or any combination thereof).

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
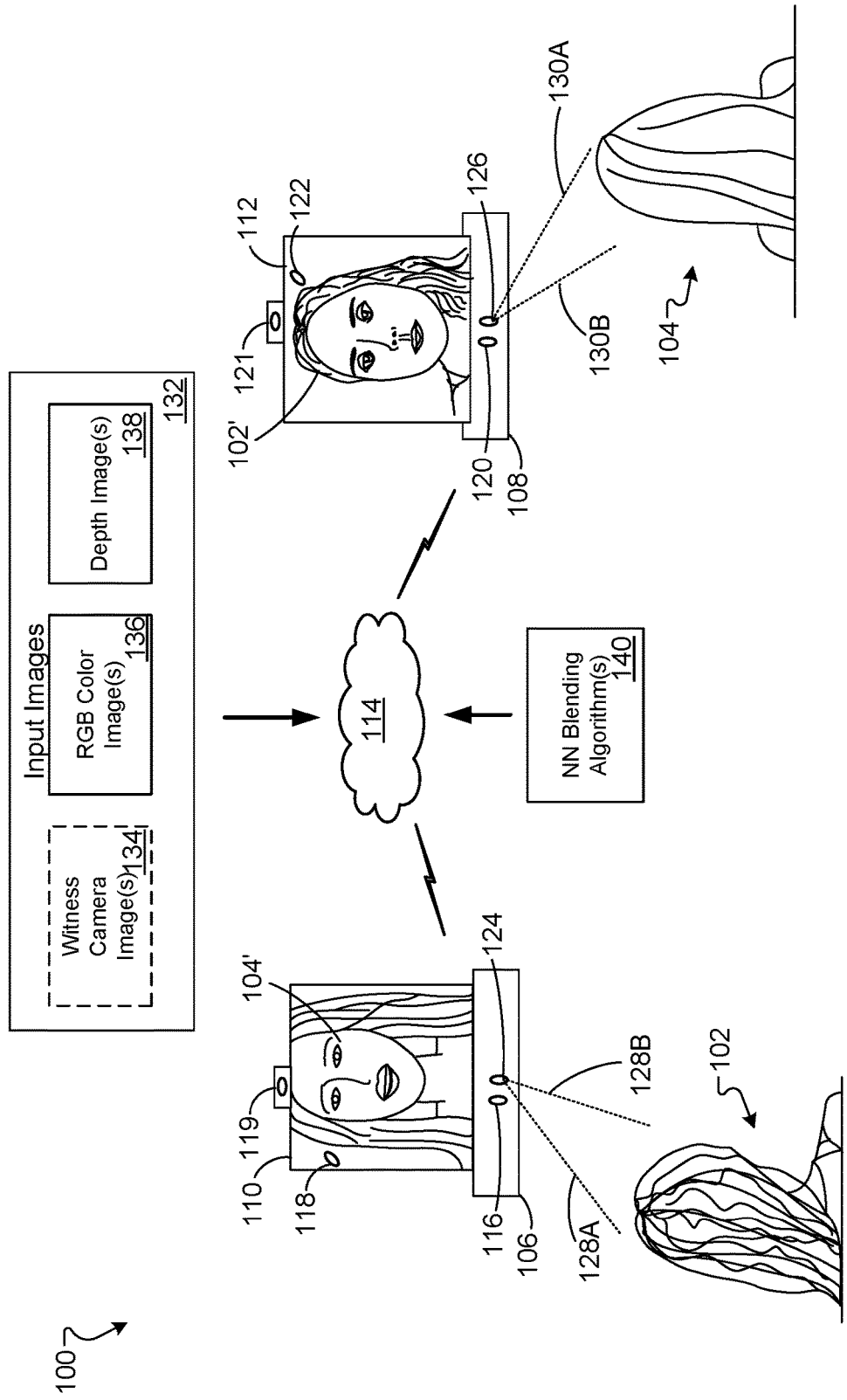
FIG. 1 is a block diagram illustrating an example 3D content system for displaying synthesized content on a display device, according to implementations described throughout this disclosure.

This document describes examples related to generating novel (e.g., unseen) views of image content. The examples described herein may synthesize (e.g., generate) real-time novel views based on captured video content and/or image content. For example, image-based rendering techniques may be used to synthesize novel views of moving image content (e.g., objects, users, scene content, image frames, etc.) using a learned blending of color views and depth views.

The systems and methods described herein may generate novel color images that have fewer artifacts than conventional systems. For example, the systems and methods described herein may correct for particular image noise and loss function analysis to generate novel images with fewer depth inaccuracies and fewer occlusions. The corrections may be performed by employing a neural network (NN) to learn to detect and correct image regions that contain visibility errors. In addition, the NN can learn and predict color values for the novel views using blending algorithms that constrain output values to be a linear combination of reprojected input colors retrieved from color input images.

In operation, the process may retrieve (e.g., capture, obtain, receive, etc.) a number of input images and data (e.g., target view parameters) to predict a novel view (e.g., an unseen color image) by combining color image streams from the input images (e.g., views) of a same scene (e.g., image content in a scene). The color image streams may be provided to a NN to employ neural rendering techniques to enhance low-quality output from real-time image capture systems (e.g., a 3D video conferencing system such as a telepresence system). For example, the novel view may be a predicted color image generated by the systems and techniques described herein. The predicted image may be generated by providing the input images and combined color image streams (e.g., and/or reprojections or representations of such input images) to a NN to allow the NN to learn particular blending weights in order to assign pixel colors to the predicted color image. The learned blending weights can be applied to generate pixel colors for the novel color image. The learned blending weights may also be used to generate other novel views of the image content represented in one or more provided input images.

In some implementations, the NNs described herein may model view-dependent effects to predict future user movement (e.g., motions) in order to mitigate mis-projection of artifacts caused by a noisy nature of particular geometry information used to generate images of the user and/or geometry information received from cameras capturing the user and/or information received from image processing performed on images of the user.

In some implementations, the systems and methods described herein can train one or more NNs (e.g., a convolutional NNs, such as a U-net) to predict an image in a viewpoint of a separate witness camera that may be used to provide supervision on the output color image, for example. The witness camera may function as a ground truth camera for the image capturing and/or processing systems described herein. In some implementations, two or more witness cameras may be used as training data for the NN. The two or more witness cameras may represent a pair or many pairs of witness cameras.

In some implementations, the systems and methods may utilize captured input images, predefined parameters associated with a desired novel output view, and/or an occlusion map that contains a depth difference and a depth map. The depth difference may be generated using a view from a color camera between a closest surface to the novel view and that of the camera view. The depth difference may be used for occlusion reasoning in order to correct for occluded views and/or other errors in generated images. In some implementations, the depth map may include a depth map from a view captured by a witness camera.

In some implementations, the systems and methods described herein may reconstruct a consensus surface (e.g., a geometric surface) by geometric fusion of input depth images. In some implementations, the systems and methods described herein may determine a projection of input colors into the novel view using depth information such as individually captured depth images and/or the consensus surface.

In some implementations, the systems and methods described herein may generate a color image for a novel view (e.g., color image) by assigning a blended color, to each pixel in the novel view. The blended color may be determined using the color input images and blending weights determined by the NNs described herein. In some implementations, the blending weights are regularized through loss functions. In some implementations, the novel view is a weighted combination of one or more pixel color values of the images projected into the novel view from the original input images.

As used herein, novel (e.g., unseen) views may include image content and/or video content that has been interpreted (e.g., synthesized, interpolated, modeled, etc.) based on one or more frames of camera-captured image content and/or video content. The interpretation of the camera-captured image content and/or video content may be used in combination with the techniques described herein to create unseen versions and views (e.g., poses, expressions, angles, etc.) of the captured image content and/or video content, for example.

In some implementations, the techniques described herein can be used to synthesize images that appear accurate and realistic for display on a screen of a 2D or 3D display used in a multi-way 2D or 3D video (e.g., telepresence) conference, for example. The techniques described herein can be used to generate and display accurate and realistic views (e.g., image content, video content) of a user in a video conference. The views include unseen views that may, conventionally, be difficult to depict in a 3D manner without significant image artifacts.

The systems and methods described herein provide an advantage of generating novel views without significant image artifacts by using one or more witness cameras and a NN to learn blending weights based on multi-view color input images and noise occlusion cues. The learned blending weights can ensure that occlusions and color artifacts are corrected in a resulting output image. In addition, the learned blending weights and the one or more witness cameras can be used by the systems described herein to ensure that image content that is uncaptured in the input images can be used to accurately predict novel views associated with the image content in the input images. For example, because the blending weights are learned and assessed with respect to witness camera images, accurate predictions can be made for image portions of the scene that were not captured or represented in the original input images.

In some implementations, the techniques described herein may be used for entertainment purposes in film, videos, shorts, game content, virtual and/or augmented reality content, or other formats including images of users that may benefit from the prediction techniques described herein. For example, the techniques described herein may be used to generate novel views for moving characters rendered in image and/or video content.

In some implementations, the techniques described herein may be used by virtual assistant devices or other intelligent agents that may perform image processing to recognize objects, recreate objects, and or generate synthesized images from such objects using the techniques described herein.

FIG. 1 is a block diagram illustrating an example 3D content system 100 for displaying content in a stereoscopic display device, according to implementations described throughout this disclosure. The 3D content system 100 can be used by multiple users to, for example, conduct video conference communications in 3D (e.g., telepresence sessions) and/or access augmented and/or virtual reality content. In general, the system of FIG. 1 may be used to capture video and/or images of users and/or scenes during a 2D or 3D video conference and use the systems and techniques described herein to generate novel views based on the captured content, in order to render accurate images depicting the novel views within the video conference session. The system 100 may benefit from the use of the techniques described herein because such techniques can generate and display real-time novel views, within a video conference for example, that accurately represent a user. The novel views may be provided for display to another user in a 2D and/or 3D manner via system 100, for example.

As shown in FIG. 1, the 3D content system 100 is accessed by a first user 102 and a second user 104. For example, the users 102 and 104 may access the 3D content system 100 to engage in a 3D telepresence session. In such an example, the 3D content system 100 can allow each of the users 102 and 104 to see a highly realistic and visually congruent representation of one another, thereby facilitating the users to interact in a manner similar to being in the physical presence of each other.

Each user 102, 104 may conduct a 3D telepresence session using a corresponding 3D system. Here, the user 102 accesses a 3D system 106 and the user 104 accesses a 3D system 108. The 3D systems 106, 108 can provide functionality relating to 3D content, including, but not limited to capturing images for 3D display, processing and presenting image information, and processing and presenting audio information. The 3D system 106 and/or 3D system 108 can constitute a collection of sensing devices integrated as one unit. The 3D system 106 and/or 3D system 108 can include some or all components described with reference to FIGS. 2 and 8.

The 3D content system 100 can include one or more 2D or 3D displays. Here, a 3D display 110 is depicted for the 3D system 106, and a 3D display 112 is depicted for the 3D system 108. The 3D displays 110, 112 can use any of multiple types of 3D display technology to provide an stereoscopic view for the respective viewer (e.g., the user 102 or user 104). In some implementations, the 3D displays 110, 112 may be a standalone unit (e.g., self-supported or suspended on a wall). In some implementations, the 3D displays 110, 112 can include or have access to wearable technology (e.g., controllers, a head-mounted display, AR glasses, etc.). In some implementations, displays 110, 112 may be 2D displays.

In general, displays 110, 112 can provide imagery that approximates the 3D optical characteristics of physical objects in the real world without the use of a head-mounted display (HMD) device. The displays described herein may include flat panel displays housing lenticular lenses (e.g., microlens arrays), and/or parallax barriers to redirect images to a number of different viewing regions associated with the display.

In some implementations, the displays 110, 112 can include a high-resolution and glasses-free lenticular 3D display. For example, displays 110, 112 can include a microlens array (not shown) that includes a plurality of lenses (e.g., microlenses) with a glass spacer coupled (e.g., bonded) to the microlenses of the display. The microlenses may be designed such that, from a selected viewing position, a left eye of a user of the display may view a first set of pixels while the right eye of the user may view a second set of pixels (e.g., where the second set of pixels is mutually exclusive to the first set of pixels).

In some example displays, there may be a single location that provides a 3D view of image content (e.g., users, objects, etc.) provided by such displays. A user may be seated in the single location to experience proper parallax, minimal distortion, and realistic 3D images. If the user moves to a different physical location (or changes a head position or eye gaze position), the image content (e.g., the user, objects worn by the user, and/or other objects) may begin to appear less realistic, 2D, and/or distorted. The systems and techniques described herein may reconfigure the image content projected from the display to ensure that the user can move around, but still experience proper parallax, low rates of distortion, and realistic 3D images in real time. Thus, the systems and techniques described herein provide the advantage of maintaining and providing 3D image content and objects for display to a user regardless of any user movement that occurs while the user is viewing the 3D display.

As shown in FIG. 1, the 3D content system 100 can be connected to one or more networks. Here, a network 114 is connected to the 3D system 106 and to the 3D system 108. The network 114 can be a publicly available network (e.g., the Internet), or a private network, to name just two examples. The network 114 can be wired, or wireless, or a combination of the two. The network 114 can include, or make use of, one or more other devices or systems, including, but not limited to, one or more servers (not shown).

The 3D systems 106, 108 can include multiple components relating to the capture, processing, transmission or reception of 3D information, and/or to the presentation of 3D content. The 3D systems 106, 108 can include one or more cameras for capturing image content and/or video (e.g., visible and IR image data) for images to be included in a 3D presentation. In the depicted example, the 3D system 106 includes cameras 116 and 118. For example, the camera 116 and/or camera 118 can be disposed essentially within a housing of the 3D system 106, so that an objective or lens of the respective camera 116 and/or 118 captured image content by way of one or more openings in the housing. In some implementations, the camera 116 and/or 118 can be separate from the housing, such as in form of a standalone device (e.g., with a wired and/or wireless connection to the 3D system 106). The cameras 116 and 118 can be positioned and/or oriented so as to capture a sufficiently representative view of a user (e.g., user 102).

While the cameras 116 and 118 generally will not obscure the view of the 3D display 110 for the user 102, the placement of the cameras 116 and 118 can be arbitrarily selected. For example, one of the cameras 116, 118 can be positioned somewhere above the face of the user 102 and the other can be positioned somewhere below the face. For example, one of the cameras 116, 118 can be positioned somewhere to the right of the face of the user 102 and the other can be positioned somewhere to the left of the face. The 3D system 108 can in an analogous way include cameras 120 and 122, for example. Additional cameras are possible. For example, a third camera may be placed near or behind display 110.

In some implementations, the 3D systems 106, 108 can include one or more witness cameras 119, 121. The witness cameras 119, 121 may be used to capture high quality images (e.g., witness camera images 132), which may represent a ground truth image. Images captured by witness camera 119 and/or camera 121 may be used with the techniques described herein to be used as a comparison when generating novel views and calculating losses and correction of such losses. In general, images captured by witness cameras 119, 121 may be captured at substantially the same moment in time as a corresponding one of the other images (e.g., frames) captured by cameras 116, 118, 120, 122, 124, and/or 126, and combinations of such cameras and/or camera pods. In some implementations, the witness camera images 134 may be captured and used as training data to one or more NN in order to generate novel views.

In some implementations, the 3D systems 106, 108 can include one or more depth sensors to capture depth data to be used in a 3D presentation. Such depth sensors can be considered part of a depth capturing component in the 3D content system 100 to be used for characterizing the scenes captured by the 3D systems 106 and/or 108 in order to correctly represent the scenes on a 3D display. In addition, the system can track the position and orientation of the viewer's head, so that the 3D presentation can be rendered with the appearance corresponding to the viewer's current point of view. Here, the 3D system 106 includes a depth sensor 124, which may also represent an infrared camera. In an analogous way, the 3D system 108 can include a depth sensor 126. Any of multiple types of depth sensing or depth capture can be used for generating depth data.

In some implementations, each camera 116, 118, 119, and 124 may represent a number of cameras in a pod. For example, the depth sensor 124 may be housed with camera 116 and/or camera 118 in a camera pod. In some implementations, three or more camera pods may be placed surrounding and/or behind display 110 and each pod may include a camera 124 (e.g., a depth sensor/camera), and one or more cameras 116, 118. Similarly, three or more camera pods may be placed surrounding and/or behind display 112 and each pod may include a camera 126 (e.g., a depth sensor/camera), and one or more cameras 120, 122.

In operation of system 106, an assisted-stereo depth capture may be performed. The scene can be illuminated using dots of lights, and stereo-matching can be performed between two respective cameras, for example. This illumination can be done using waves of a selected wavelength or range of wavelengths. For example, infrared (IR) light can be used. Depth data can include or be based on any information regarding a scene that reflects the distance between a depth sensor (e.g., the depth sensor 124) and an object in the scene. The depth data reflects, for content in an image corresponding to an object in the scene, the distance (or depth) to the object. For example, the spatial relationship between the camera(s) and the depth sensor can be known, and can be used for correlating the images from the camera(s) with signals from the depth sensor to generate depth data for the images.

The images captured by the 3D content system 100 can be processed and thereafter displayed as a 3D presentation. As depicted in the example of FIG. 1, 3D image of user 104 is presented on the 3D display 110. As such, the user 102 can perceive the 3D image 104' (e.g., of a user) as a 3D representation of the user 104, who may be remotely located from the user 102. Similarly, the 3D image 102' is presented on the 3D display 112. As such, the user 104 can perceive the 3D image 102' as a 3D representation of the user 102.

The 3D content system 100 can allow participants (e.g., the users 102, 104) to engage in audio communication with each other and/or others. In some implementations, the 3D system 106 includes a speaker and microphone (not shown). For example, the 3D system 108 can similarly include a speaker and a microphone. As such, the 3D content system 100 can allow the users 102 and 104 to engage in a 3D telepresence session with each other and/or others. In general, the systems and techniques described herein may function with system 100 to generate image content and/or video content for display amongst users of system 100.

In operation of system 100, a set of input images 132 may be captured by cameras 116, 118, 119, 124 and/or 120, 121, 122, and 126. The input images may include witness camera images 134 and RGB color images 136, for example. In some implementations, the system 100 may also generate and/or otherwise obtain depth images 138. In one example, the depth images 138 may be generated by performing one or more stereo computations from a pair of IR images retrieved from IR cameras, as described above. The input images 132 may be used as a basis with which to predict an output image that is a linear combination of the reprojected colors from the input image(s). In some implementations, the input images 132 may include two or more color images that represent reprojected color images (e.g., Red Green Blue (RGB)) captured with known (e.g., predetermined, predefined) view parameters. In some implementations, the input images 132 also include one or more depth images 138 computed (e.g., generated) with the known view parameters. The input images 132 may be used in combination with particular camera parameters, view parameters, and/or NN blending algorithms 140 to generate novel views for display on displays 110 and/or 112.

Figure 2:
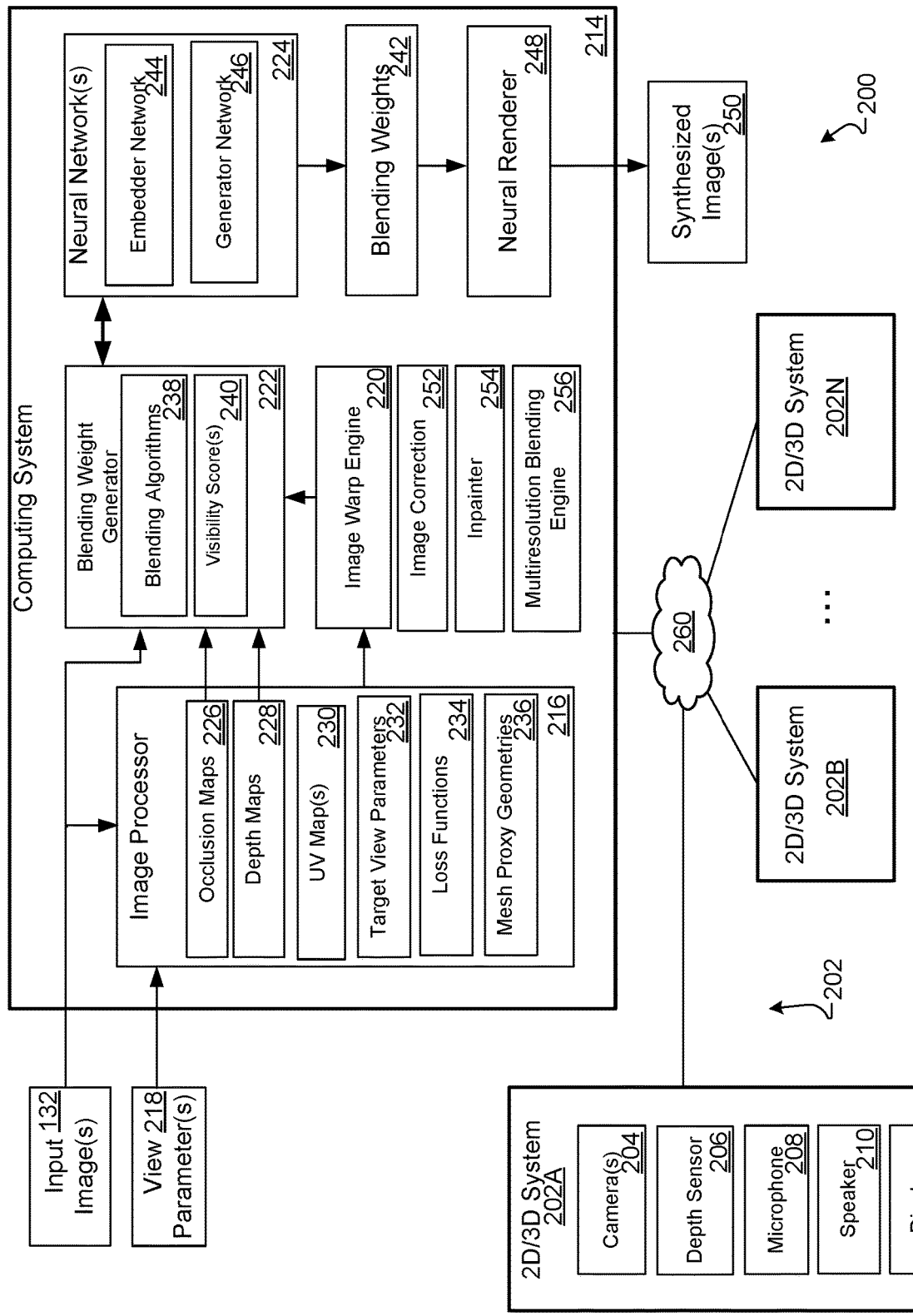
FIG. 2 is a block diagram of an example system for synthesizing content for rendering on a display, according to implementations described throughout this disclosure.

FIG. 2 is a block diagram of an example system for synthesizing content for rendering on a display, according to implementations described throughout this disclosure. The system 200 can serve as, or be included within, one or more implementations described herein, and/or can be used to perform the operation(s) of one or more examples of synthesizing, processing, modeling, or presentation of the image content described herein. The overall system 200 and/or one or more of its individual components, can be implemented according to one or more examples described herein.

The system 200 may include one or more 3D systems 202. In the depicted example, 3D systems 202A, 202B through 202N are shown, where the index N indicates an arbitrary number. The 3D system 202 can provide for capturing of visual and audio information for a 2D or a 3D presentation, and can forward the 2D or 3D information for processing. Such information can include images of a scene, depth data about the scene, parameters associated with image capture, and/or audio from the scene. The 2D/3D system 202 can serve as, or be included within, the systems 106 and 108 and 2D/3D displays 110 and 112 (FIG. 1). Although systems 202B and 202N do not depict the same modules as depicted in system 202A, each module in system 202A may also be present in systems 202B and 202N.

The system 200 may include multiple cameras, as indicated by cameras 204. Any type of light-sensing technology can be used for capturing images, such as the types of images sensors used in common digital cameras. The cameras 204 can be of the same type or different types. Camera locations may be placed within any location on a 3D system such as system 106, for example. In some implementations, each systems 202A, 202B, and 202N include three or more camera pods that each include a depth camera (e.g., depth sensor 206 and/or one or more pairs of IR cameras whose content is analyzed using stereo algorithms to infer a depth image) and one or more color cameras. In some implementations, the systems 202A, 202B, and 202N also include one or more witness cameras (not shown) that may capture images to be used as ground truth images when generating novel views and/or e.g. for training the neural network.

The system 202A includes a depth sensor 206. In some implementations, the depth sensor 206 operates by way of propagating IR signals onto the scene and detecting the responding signals. For example, the depth sensor 206 can generate and/or detect the beams 128A and/or 128B and/or 130A and/or 130B. In some implementations, the depth sensor 206 may be used to compute occlusion maps. The system 202A also includes at least one microphone 208 and a speaker 210. In some implementations, the microphone 208 and speaker 210 may be part of system 106.

The system 202 additionally includes a 3D display 212 that can present 3D images. In some implementations, the 3D display 212 can be a standalone display and in some other implementations the 3D display 212 may be integrated into AR glasses, head-mounted display devices, and the like. In some implementations, the 3D display 212 operates using parallax barrier technology. For example, a parallax barrier can include parallel vertical stripes of an essentially non-transparent material (e.g., an opaque film) that are placed between the screen and the viewer. Because of the parallax between the respective eyes of the viewer, different portions of the screen (e.g., different pixels) are viewed by the respective left and right eyes. In some implementations, the 3D display 212 operates using lenticular lenses. For example, alternating rows of lenses can be placed in front of the screen, the rows aiming light from the screen toward the viewer's left and right eyes, respectively.

The system 200 can include a computing system 214 that can perform certain tasks of data processing, data modeling, data coordination, and/or data transmission. In some implementations, the computing system 214 may also generate images, blend weights, and perform neural processing tasks. In some implementations, the computing system 214 is an image processing system. The computing system 214 and/or components thereof can include some or all components described with reference to FIG. 8.

The computing system 214 includes an image processor 216 that may generate 2D and/or 3D information. For example, the image processor 216 may receive (e.g., obtain) one or more input images 132 and/or view parameters 218 and may generate image content for further processing by an image warp engine 220, a blending weight generator 222, and/or NN 224. The input images 132 may include captured color (e.g., RGB, YUV, CMYK, CIE, RYB) images.

The view parameters 218 may include camera parameters associated with capture of particular input images 132 and/or associated with capture of an image to be generated (e.g., synthesized). In general, view parameters 218 may represent a camera model approximation. The view parameters 218 may include any or all of a view direction, a pose, a camera perspective, lens distortions, and/or intrinsic and extrinsic parameters of a camera.

The image processor 216 also includes (and/or generates and/or receives), occlusion maps 226, depth maps 228, UV maps 230, target view parameters 232, loss functions 234, and mesh proxy geometries 236.

The occlusion maps 226 may encode signed distances between surface points that are determined to be closest to a target viewpoint and a camera capturing the surface. A positive value may indicate that a point is being occluded from a view. Thus, the system 200 may configure the blending weight generator 222 (and NN 224) to not use positive valued distances when determining blending weights 242, as such occluded image content would not provide accurate reproduction data when generating new or novel views based on captured image content. In some implementations, occlusion maps 226 can be used to assess a difference in depth between a depth observed in a particular view and the geometrically fused model associated with the view.

The depth maps 228 represent one or more images that contain information relating to a distance of the surfaces of particular scene objects from a selected viewpoint. In some implementations, the depth maps 228 correspond to each of three color camera images and/or depth from a target viewpoint to a nearest surface point determined for each output pixel in a synthesized (e.g., novel) view.

The UV maps 230 be generated from visible content in an input image 132. In particular UV maps 230 represent a projection of a 2D image to a 3D model surface in order to perform texture mapping to generate features that may be used to generate synthesized images (e.g., novel views).

The target view parameters 232 represent view parameters for a novel synthesized image (i.e., view parameters for generating a virtual view of the target subject). The target view parameters 232 may include image parameters, and/or camera parameters associated with an image to be generated (e.g., synthesized). The target view parameters 232 may include a view direction, a pose, a camera perspective, and the like.

The loss functions 234 may assess differences between a ground truth image and a predicted image, where the predicted image is predicted based on a combination of both visible light information captured for a frame, IR light captured for the frame, and the blending weights associated with colors and/or depth. The loss functions 234 may include functions that describe any or all image errors, image holes, image mis-projection artifacts, and the like.

In some implementations, the loss functions 234 can include a reconstruction loss based on a reconstruction difference between a segmented ground truth image mapped to activations of layers in a NN and a segmented predicted image mapped to activations of layers in the NN. The segmented ground truth image may be segmented by a ground truth mask to remove background pixels and the segmented predicted image may be segmented by a predicted mask to remove background pixels. The predicted mask may be predicted based on a combination of both visible light information captured for a frame and IR light captured for a frame.

The mesh proxy geometries 236 may represent a coarse geometry that includes a set of K proxies $\{P_{i,1}, \ldots, P_{i,K}\}$ (i.e., rectangular, triangular, etc. meshes with UV coordinates). For example, a 2D image may be projected to a 3D proxy model surface in order to generate a mesh proxy geometry 236. The proxy may function to represent a version of the actual geometry of particular image content. In operation, system 200 uses proxy geometry principles to encode a geometric structure using a set of coarse proxy surfaces (e.g., mesh proxy geometries 236) as well as shape, albedo, and view dependent effects.

The image warp engine 220 may be configured to receive one or more input images (e.g., frames, stream) and/or other capture/feature parameter data and generate a feature-preserving one or more output images (e.g., frames, stream). The image warp engine 220 may utilize the capture/feature parameter data to reconstruct the input images in some manner. For example, the image warp engine 220 may generate reconstructed candidate color images from the input images, where each pixel in a reconstructed image is a candidate pixel for a new synthesized image corresponding to one or more of the input images.

In some implementations, the image warp engine 220 may perform functions on the input images at the pixel level in order to preserve small scale image features. In some implementations, the image warp engine 220 may use non-linear or linear functions to generate reconstructed images.

The blending weight generator 222 includes blending algorithms 238 and visibility scores 240. The blending algorithms 238 may be used to generate blending weights 242. In particular the blending algorithms 238 may be accessed via NN 224 to generate blending weights 242. Blending weights 242 represent values for particular pixels of images that may be used to contribute to aspects of the pixels in a resulting (e.g., final, novel image). The blending algorithms 238 include heuristics based algorithms for computing blending weights for shading a particular set of depth images and/or fused geometry representing the depth images. The blending algorithms receive multi-view color images and noisy occlusion cues as input in order to learn output blending weights for a novel view (e.g., novel synthesized image). In some implementations, texture (e.g., received from camera pod(s)) and visibility scores 240 with respect to a target view and input images may also be provided as inputs to the blending algorithms 238.

The visibility scores 240 may represent the visibility of a particular pixel or feature of a captured object in an image Each visibility score 240 may represent a single scalar value to indicate which portions (e.g., pixels, features, etc.) of the image are visible in a particular view of an input image. For example, if a far left side of a user's face is not viewable in an input image of the user, the visibility score 240 for the pixels that represent the far left side of the user's face may be weighted low while other areas that can be viewed and/or are captured well in the input image may be weighted high. Visibility scores may be taken into account when generating blending weights 242 for novel views (e.g., images).

The neural network 224 includes an embedder network 244 and a generator network 246. The embedder network 244 includes one or more convolution layers and down-sampling layers. The generator network 246 includes one or more convolution layers and up-sampling layers.

The in-painter 254 may generate content (e.g., pixels, regions, etc.) that may be missing from a particular texture or image based on a local neighborhood of pixels surrounding a particular missing content portion. In some implementations, the in-painter 254 may utilize the blending weights 242 to determine how to in-paint particular pixels, regions, etc. The in-painter 254 may utilize output from the NN 224 to predict particular background/foreground mattes for rendering. In some implementations, the in-painter 254 may function with the image correction engine 252 to pull-push hole-filing. This can be performed in images that have regions/pixels of missing depth information which may result in no output color predicted by the NN 224. The image correction engine 252 may trigger the in-painter to colorize particular regions/pixels in an image.

Once the blending weights 242 are determined, the system 214 may provide the weights to a neural renderer 248. The neural renderer 248 may generate an intermediate representation of an object (e.g., user) and/or scene, for example, that utilizes the NN 224 (or another NN). The neural renderer 248 may incorporate view dependent effects by modelling the difference between true appearance (e.g., a ground truth) and a diffuse reprojection with an object-specific convolutional network, for example.

In operation, the system 200 may receive a stereo-fusion pipeline that produces (1) depth maps corresponding to each of three color camera images and (2) depth values from a target viewpoint to a nearest surface point determined for each output pixel, $D_t$ in a synthesized view. For example, an image capture system may include at least three camera pods. Each camera pod may include one or more color cameras and a depth camera (e.g., cameras 204, depth sensor 206). In some implementations, the image capture system may additionally include a witness camera pod. In this example, the system may perform geometric warping to transform information from the three camera pods into a target image space for the witness camera pod. In particular, for each k of the three color cameras, a reproduced color (e.g., RGB) image, an $I_k^{warp}$ value may be calculated to represent reprojected RGB images (e.g., reprojected images 404), using target viewpoint depths (e.g., depth maps 228) reprojected into 3D space. In addition, an $I_k^{occl}$ value may be calculated to represent an occlusion map (e.g., occlusion map 226) that encodes signed distances between surface points closest to a predefined target viewpoint and a camera. A positive value indicates that an image point is occluded from view. A negative value indicates that an image point is not occluded from view.

The $I_k^{warp}$ values and the $I_k^{occl}$ values are then concatenated with $D_t$ into a 13-channel-per-pixel tensor for a first fully two dimensional convolutional layer of the NN 224. The network may predict an image W where each channel is a non-negative floating point value for each input color image pixel. The system 214 may then construct an output image $I_N$.

In some implementations, system 214 may perform multiresolution blending using a multiresolution blending engine 256. The multiresolution blending engine 256 may employ image pyramids as inputs to a convolutional neural network (e.g., NN 224/414), which generate blending weights at multiple scales with an opacity value associated with each scale. In operation, the multiresolution blending engine 256 may employ a two-stage, trained end-to-end convolutional network process. The engine 256 may utilize a number of source cameras.

The synthesized view 250 represents a 3D stereoscopic image of content (e.g., a VR/AR object, a user, a scene, etc.) with proper parallax and viewing configuration for both eyes associated with the user accessing a display (e.g., display 212) based at least in part on calculated blending weights 242, as described herein. At least a portion of the synthesized view 250 may be determined based on output from a neural network (e.g., NN 224) using system 214 each time the user moves a head position while viewing the display and/or each time a particular image changes on the display. In some implementations, the synthesized view 250 represents a user's face and other features of the user surrounding the user's face and within a view capturing the user's face. In some implementations, the synthesized view 250 represents an entire field of view captured by one or more cameras associated with telepresence system 202A, for example.

In some implementations, processors (not shown) of systems 202 and 214 may include (or communicate with) a graphics processing unit (GPU). In operation, the processors may include (or have access to memory, storage, and other processor (e.g., a CPU)). To facilitate graphics and image generation, the processors may communicate with the GPU to display images on a display device (e.g., display device 212). The CPU and the GPU may be connected through a high speed bus, such as PCI, AGP, or PCI-Express. The GPU may be connected to the display through another high speed interface such as HDMI, DVI, or Display Port. In general, the GPU may render image content in a pixel form. The display device 212 may receive image content from the GPU and may display the image content on a display screen.

Although not depicted in FIG. 2, additional maps such as feature maps may be provided to one or more NNs 224 to generate image content. The feature maps may be generated by analyzing an image to generate features for each pixel of the image. Such features may be used to generate feature maps and texture maps, which may be provided to blending weight generator 222 and/or NN 224 to assist with generating blending weights 242.

Figure 3:
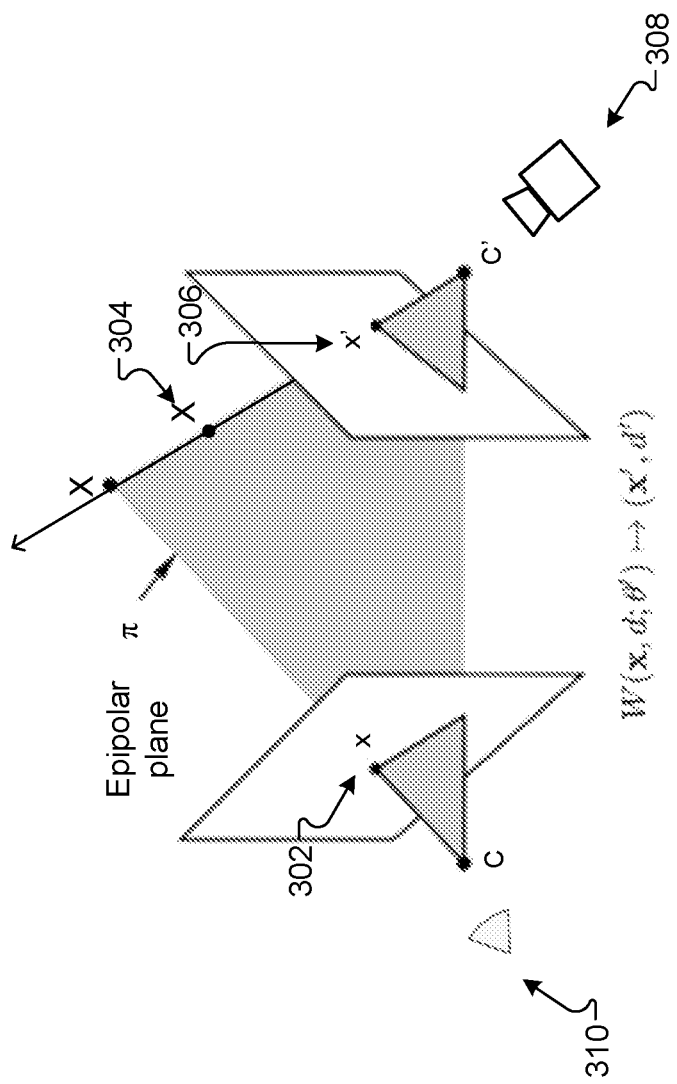
FIG. 3 is a block diagram of an example illustrating a reprojection of input images to a target camera viewpoint, according to implementations described throughout this disclosure.

FIG. 3 is a block diagram of an example illustrating a reprojection of input images to a target camera viewpoint, according to implementations described throughout this disclosure. The system 200 may be used to generate the reprojections of images to be used as input images a NN, for example. Warping an image may include reprojecting captured input images 132 to a target camera viewpoint using fused depths (from depth images) to target the camera viewpoint. In some implementations, the input images 132 are already in the form of reprojected images. In some implementations, the image warp engine 220 performs the warping.

For example, the image warp engine 220 may back-project a target image point x 302 to a ray. The image warp engine 220 may then find a point X 304 at a distance d from a target camera 308. Next, the image warp engine 220 may project X to a pod image point x' 306, which is a distance d' from a pod camera 310. Equations [1]-[3] below depict this calculation:

$$W = P_{\theta'} \circ P_{\theta_T}^{-1} \quad [1]$$

$$X = P_{\theta_T}^{-1}(u,v,1,1/d')^T \quad [2]$$

$$(u',v',1,1/d')=P_{\theta'}(X) \quad [3]$$

Next, the image warp engine 220 may bilinearly sample a texture camera image at x', as shown by equations [4] and [5] below:

$$I_{warp}^T(I_i)(x)=S(I_i)(x') \quad [4]$$

$$D_{warp}^T(D)(x)=S(D_i)(x') \quad [5]$$

Figure 4:
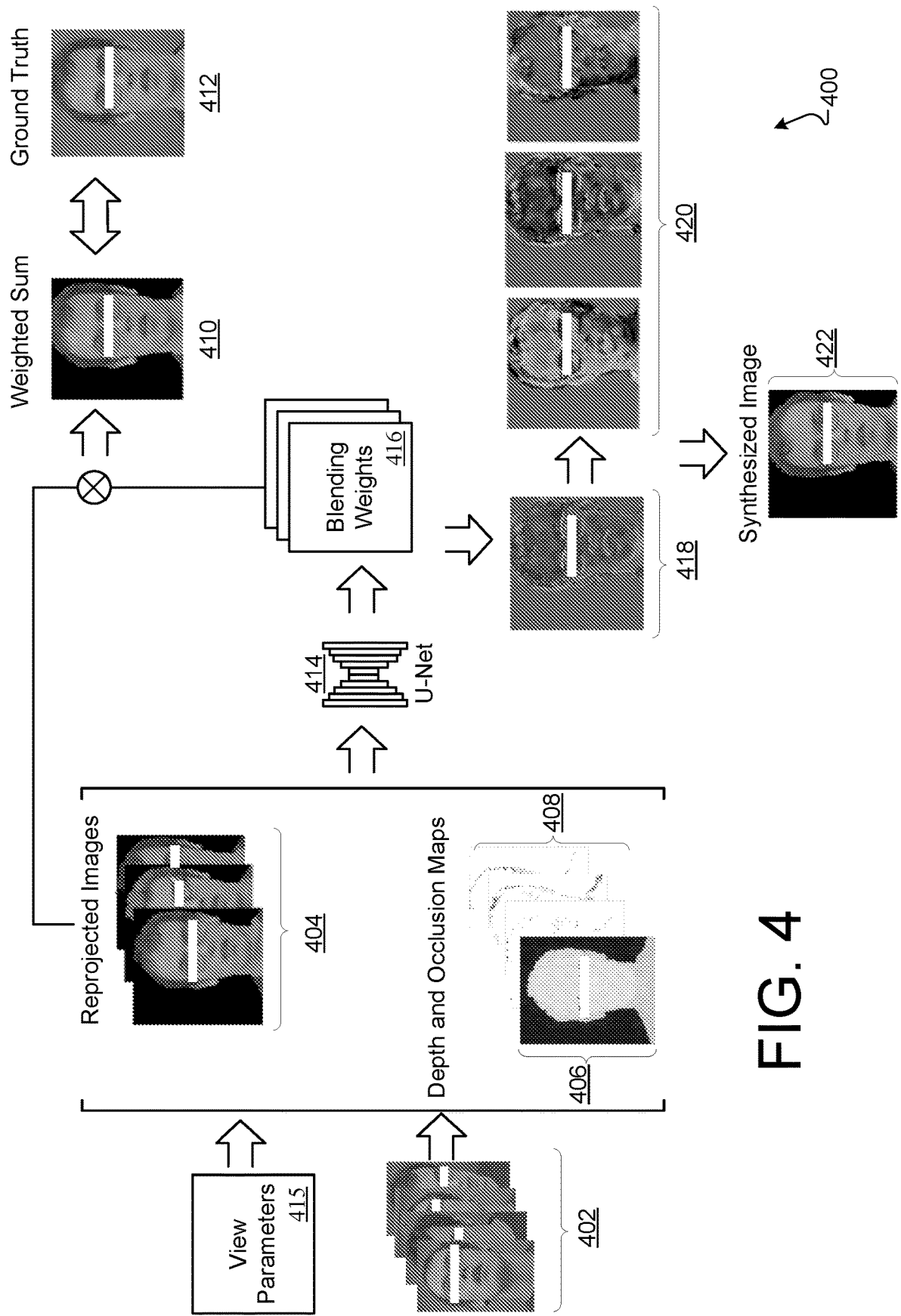
FIG. 4 is a block diagram of example flow diagram for using neural blending techniques to generate synthesized content for rendering on a display, according to implementations described throughout this disclosure.

FIG. 4 is a block diagram of example flow diagram 400 for using neural blending techniques to generate synthesized content for rendering on a display, according to implementations described throughout this disclosure. The diagram 400 may generate data (e.g., Multiview color images, noisy occlusion cues, depth data, etc.) to be provided to a blending algorithm via a neural network. The neural network can then learn the output blending weights.

In this example, a number of input images 402 may be obtained (e.g., received). For example, a system 202A may capture a number of input images 402 (e.g., image frames, video). The input images 402 may be color images. The input images 402 may also be associated with depth images captured at substantially the same time as the input images. The depth images may be captured by an infrared camera, for example.

The computing system 214 may warp (e.g., reproject) the input images 402 into reprojected images 404 using the input image colors and the depth images. For example, the warp engine 220 may reproject input images 402 into an output view that represents a desired novel view. In particular, the warp engine 220 may retrieve color from the input images 402 and warp the colors into the output view using the depth views associated with the input images. In general, each input image may be warped into a single reprojected view. Thus, if four input images are retrieved, the warp engine 220 may generate four reprojected views, each associated with a single input image. The reprojected images 404 function as candidate colors that may be selected for a pixel in a novel synthesized output image. The depth views that are captured at substantially the same time as the input images 402 may be used to generate depth maps 406 and occlusion maps 408 (similar to depth maps 228 and occlusion maps 226).

The reprojected images 404 may be used to generate a weighted sum image 410 representing a weighted combination of colors for pixels. The weighted sum image 410 may also take into account a ground truth image 412. The ground truth image 412 may be captured by one or more witness cameras.

The reprojected images 404, the depth maps 406, and the occlusion maps 408 may be provided to the NN 414, which shown in FIG. 4 is a convolutional neural network with a U-Net shape. Other NNs are of course possible. In one non-limiting example, the NN 414 inputs may include three color RGB images, an occlusion map, and a target view depth map, which may utilize about fourteen channels.

In some implementations, a number of view parameters 415 may be provided to the NN 414 as well. The view parameters 415 may pertain to a desired novel view (e.g., image). The view parameters 415 may include any or all of a view direction, a pose, a camera perspective, lens distortions, and/or intrinsic and extrinsic parameters of a camera (virtual or actual camera).

The NN 414 may generate blending weights 416 for each reprojected image 404 to determine how to combine the colors of the reprojected images 404 to generate an accurate novel output image. The reprojected images 404 may be computed by warping the input images 402, for example, into a novel view, according to the depth images 406. The NN 414 may use blending weights 416 and reprojection images 404 to generate blended texture image 418, e.g. by blending at least portions of the reprojection images 404 with one another using the blending weights 416. The blended texture image 418 may be used to generate an image associated with each camera pod associated with an input image 402 and thus associated with a reprojected image 404. In this example, three camera pods were used to capture three color images (e.g., input images 402) and three depth images (e.g., represented by depth map 406). Thus, three corresponding image views are outputted, as shown by images 420. The can utilize the image 418 and images 420 to synthesize a novel view, as shown by synthesized image 422.

In operation, the NN 414 may use the blending weights 416 to determine how to combine the reprojected colors associated with reprojected images 404 to generate an accurate synthesized image 422. The NN 414 may determine the blending weights by learning over the space of a predefined output view.

The network architecture of NN 414 may be a deep neural network that is a U-Net shaped network with all convolutional layers using a same padding value and a rectified linear unit activation function. The output may include blending weights 416 for the three reprojected images 404, a channel per camera pod where the output weight is generated according to equation [6]:

$$W' = 10^{-2} * W + 1/3, \text{ clamp to } [0,1] \quad [6]$$

The diagram 400 may be carried out to take into account training losses. For example, a reconstruction loss, perceptual loss on blended color images, and a completeness loss may be determined and used to improve the resulting synthesized image 422.

In operation, the system 200 may utilize several aspects to generate per-pixel loss values. For example, a novel view image $I_N$ and neural blend weights $W_i$ for a texture camera i may be represented as shown in equation [7]:

$$I_N = \Sigma_i w_i \odot I_{warp}^N(I_i) \quad [7]$$

and an invalid target depth mask where no inputs have RGB values may be represented as $I_{mask}$.

In particular, an example loss function may be represented with the following equation [8]:

$$D(I_N \odot I_{mask}, I_{witness} \lfloor I_{mask}) + \alpha_c L_{compl}(W) + \alpha_0 \Sigma_k L_{occl}(I_k^{warp} \lfloor W_k I_k^{occl}(I_i)) \quad [8]$$

where $D := \alpha_r L_1 + \alpha_c VGG$ represents reconstruction and perceptual losses. Put another way, the reconstruction and perceptual loss on a blended color image may be represented, as shown in equation [9]:

$$D := L_1 + \alpha L_{VGG}, D(I_N \lfloor I_{Mask}, I_{witness} \lfloor I_{Mask}) \quad [9]$$

Completeness loss, on a network output blend weights for each x, y pixel coordinate may be represented, as shown in equation [10]:

$$L_{compl}(W) = \Sigma_x \Sigma_y |(\Sigma_k w_{k,x,y}) - 1| \quad [10]$$

Occlusion loss on the network may be represented, as shown in equation [11]:

$$L_{occl}(C, O) = \|c_{x,y}\|_1, \text{ if } o_{x,y} > \tau \quad [11]$$

In some implementations, the NN 414 may be trained based on minimizing an occlusion loss function (i.e., equation [8]) between the synthesized image 422 generated by the NN 414 and the ground truth image 412 captured by at least one witness camera.

Figure 5:
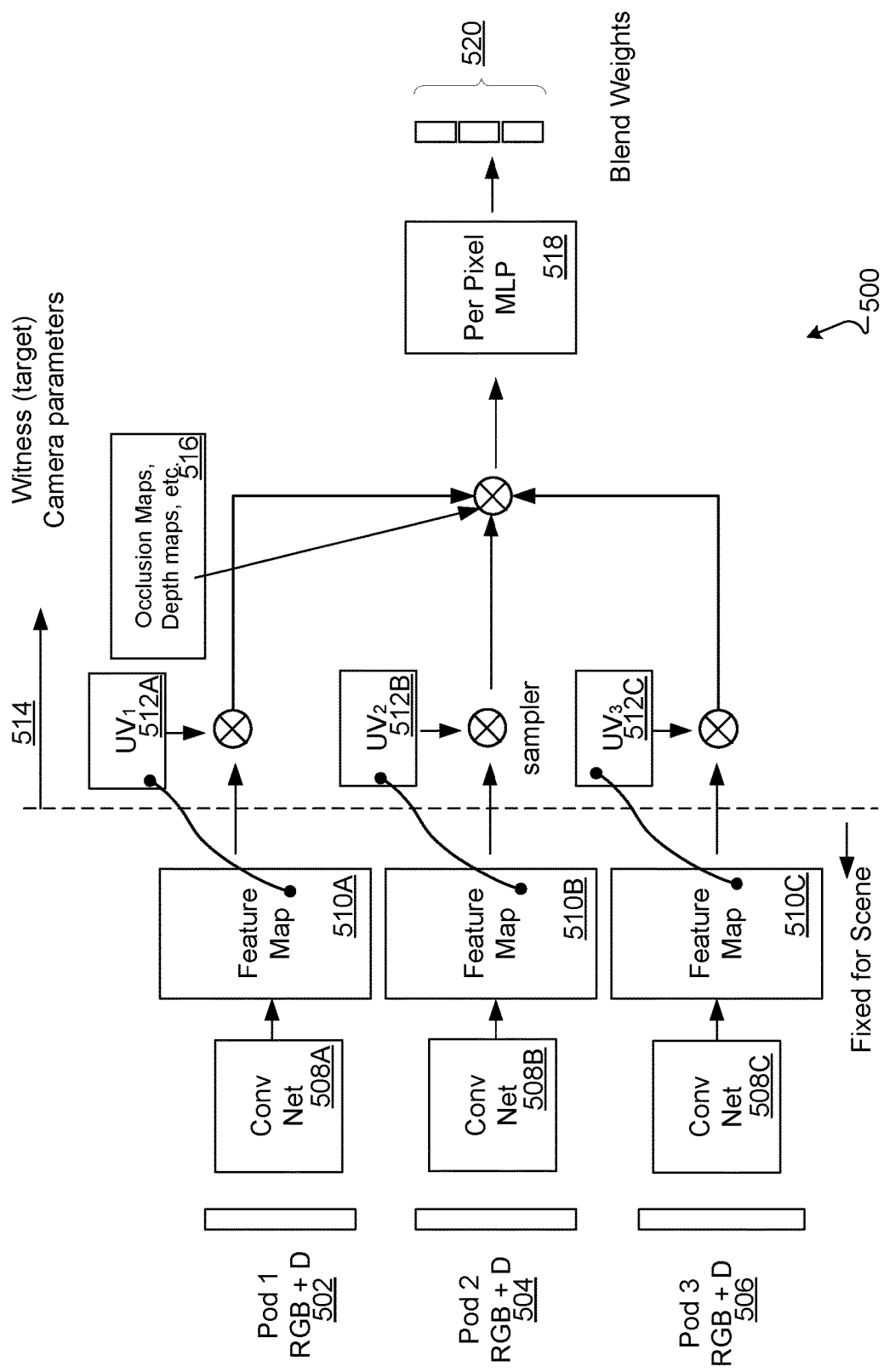
FIG. 5 is a block diagram of an example flow diagram for generating blend weights, according to implementations described throughout this disclosure.

FIG. 5 is a block diagram of an example flow diagram for generating blend weights, according to implementations described throughout this disclosure. This example may employ convolutional NNs (e.g., convolutional U-Nets) to process pixels of each input view, for example. A multilayer perceptron (MLP) may be used to generate blend weights in order to assign each pixel of a proposed synthesized view. The blend weights generated by the MLP can be used to combine features from the input image(s)/view(s).

In some implementations, generating the blend weights may involve the use of multiresolution blending techniques. The multiresolution blending techniques employ a two-stage, trained end-to-end convolutional network process. The techniques utilize a number of source cameras. For example, the system 202A may capture one or more input images (e.g., RGB color images) from each of a first camera pod 502, a second camera pod 504, and a third camera pod 506. Similarly, and at substantially the same time, the pods 502-504 can each capture (or calculate) a depth image corresponding to a particular input image.

The at least three color source input images and the at least three source depth images may be provided to the convolutional network(s) 508A, 508B, and 508C (e.g., convolutional U-Nets) to generate feature maps that embed view-dependent information. For example, one or more feature maps (not shown) may represent the features of the input images in feature space. In particular, for each input image/depth image 502-504, a feature map (e.g., feature maps 510A, 510B, and 510C) may be generated using extracted features of the images. In some implementations, the input images may include two color source images and a single depth image. In such an example, the system 500 may reproject each of the two color input images into the output view using the single depth image.

The feature maps 510A-510C may be used to generate UV maps 512A, 512B, and 512C. For example, the UV maps 512A-C may be generated from visible content in input images 502-504 using feature maps 510A-510C. The UV maps 512A-512C represent a projection of a 2D image to a 3D model surface in order to perform texture mapping to generate features that may be used to generate synthesized images (e.g., novel views). The outputted neural textures remain in source camera image coordinates.

Respective feature maps 510A-510C may each be sampled together with respective UV maps 512A-512C and witness camera parameters 514. For example, system 500 may use a witness camera as a target camera for producing the synthesized novel images. The witness (e.g., target) camera parameters 514 may be predefined. Each of the respective, sampled feature maps 510A-510C and UV maps 512A-C may be used with parameters 514 and sampled together with occlusion maps and depth maps 516. The sampling may include a differentiable sampling layer that warps each neural texture using UV-maps 512A-512C which are pre-computed from fused geometry (e.g., mesh proxy geometries 236).

The sampled content may be used by a per pixel multi-layer perceptron (MLP) NN 518 in order to generate occlusion maps, depth maps, etc. of sampled features from all source camera views. From the maps, the MLP 518 may generate a set of blending weights 520. For example, the per-pixel MLP 518 maps may include sampled features from any number of source camera views, which can be used to generate a set of blending weights 520. Such blending weights 520 may be used to generate a synthesized image.

In some implementations, the processes described herein may incorporate multiresolution blending techniques. For example, the multiresolution blending techniques may be performed by multiresolution blending engine 256, for example, and may employ image pyramids as inputs to a convolutional neural network (e.g., NN 224/414), which generate blending weights at multiple scales with an opacity value associated with each scale.

Output blending weights at each scale are used to construct an output color image using the input reprojected color images at that scale, forming an output image pyramid. Then, each level of this pyramid is weighted by the associated opacity values and up-sampled to the original scale. The resulting set of images are then summed to construct the final output image. This is advantageous due to the fact that small holes (due to missing geometry) exist in the input reprojected images, the down-scaling then up-scaling process fills in missing regions with neighboring pixel values. Also, the procedure may generate a softer silhouette that is visually more appealing than conventional blending techniques.

In some implementations, input pyramids can be built by down-sampling bilinear reprojected colors of the reprojected images, un-pre-multiplying by down-sampled valid depth mask (e.g., map), up-sampling back to a predefined (e.g., original) resolution, and un-pre-multiplying by up-sampled valid depth mask. For each layer, the flow diagram may add an output layer decoder (for blend weights and alpha), up-sample to a predefined (e.g., original resolution), adjust for additional background alpha at a highest resolution, normalize alphas using a soft max function, and blend with reprojected colors and the background.

The multiresolution blending techniques employ a two-stage, trained end-to-end convolutional network process. For each stage, the multiresolution blending techniques may add an output layer decoder (e.g., on blend weights and alpha losses, for example. The techniques may compute an RGB image, add in the losses, multiply by alpha, and concatenate to determine a candidate RGB image. The candidate RGB image may be up-sampled. An output image (e.g., a novel view/synchronized image) may be generated using the up-sampled candidate image with the losses accounted for.

In operation, the techniques utilize a number of source cameras. For example, the system 202A may capture one or more input images (e.g., RGB color images) from each of a first camera pod 502, a second camera pod 504, and a third camera pod 506. Similarly, and at substantially the same time, the pods 502-504 can each capture a depth image corresponding to a particular input image.

Multiresolution blending may use a same 3D point in a scene map to a same point location on a feature map, regardless of how an output viewpoint moves. This may ensure that no 2D convolutions are performed and thus, output includes the same blend weights for the point location because input features are fixed.

Figure 6:
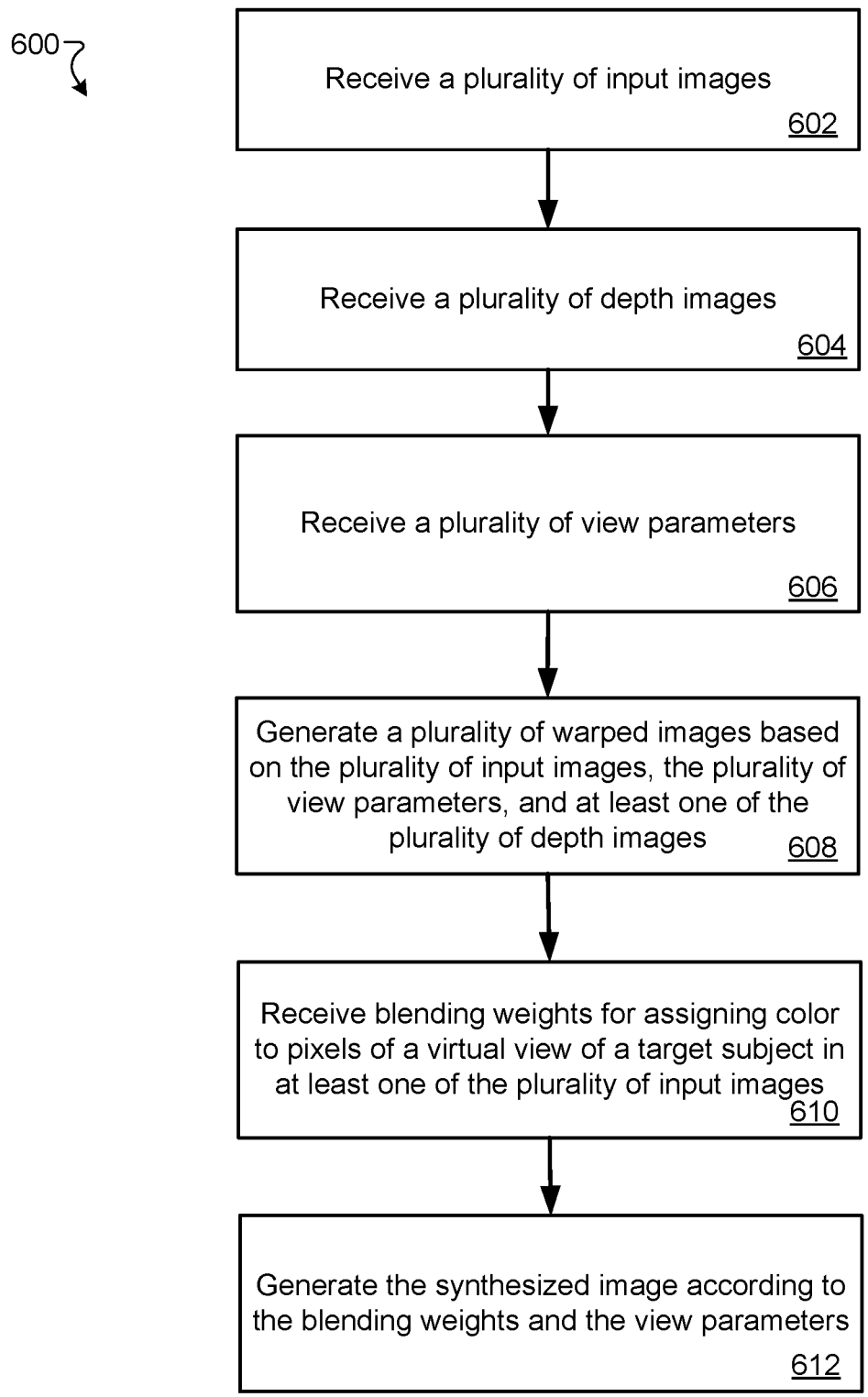
FIG. 6 is a flow chart diagramming one example of a process to generate synthesized content using neural blending techniques, according to implementations described throughout this disclosure.

FIG. 6 is a flow chart diagramming one example of a process 600 to generate synthesized content using neural blending techniques, according to implementations described throughout this disclosure. The process 600 is described with respect to an example implementation of the system 100 and/or 200 of FIGS. 1 and 2 and/or system 500 and/or 800, but it will be appreciated that the method can be implemented by systems having other configurations. In general, one or more processors and memory on the systems 202 and/or computing system 214 may be used to carry out process 600.

At a high level, process 600 may utilize color input images, depth images corresponding to the input images, and view parameters associated with a desired novel view corresponding to at least a portion of content within the input images. The process 600 may provide the above elements or versions of the above elements to a neural network to receive blending weights for determining particular pixel colors and depth for the desired novel view. The view may be used with the blending weights to generate a novel output image.

At block 602, the process 600 may include receiving a plurality of input images. For example, a system 202A (or other image processing system) may capture input images from two or more camera pods using cameras (e.g., cameras 204). In general, the plurality of input images are color images captured according to predefined view parameters. However, in some implementations, the plurality of input images may be gradated images of a single color (e.g., sepia, grayscale, or other gradated color). The predefined view parameters may include camera parameters associated with capture of particular input images 132 (e.g., input images 402) and/or associated with capture of an image to be generated (e.g., synthesized). In some implementations, the view parameters may include any or all of a view direction, a pose, a camera perspective, lens distortions, and/or intrinsic and extrinsic parameters of a camera. In some implementations, the plurality of input images may include a number of target subjects captured within the frames of the images. A target subject may include a user, a background, a foreground, a physical object, a virtual object, a gesture, a hairstyle, a wearable device, etc.

At block 604, the process 600 may include receiving a plurality of depth images associated with a target subject in at least one of the plurality of input images. For example, at substantially the same time of capture as the input images (e.g., RGB color images 136), the system 202A may capture the depth images 138. The depth images may capture a target subject which is also captured in one or more of the plurality of input images. The depth images may each include a depth map (e.g., map 228) associated with at least one camera 204 that captured at least one of the plurality of input images 132, at least one occlusion map 226, and a depth map (e.g., via target view parameters 232) associated with a ground truth image captured by at least one witness camera at a time corresponding to capture of at least one of the plurality of input images. In short, the system 200 may take into account a depth of input images and a depth of desired target view of a witness camera (or other determined target view) when generating blending weights 242 for the target view.

At block 606, the process 600 may include receiving a plurality of view parameters for generating a virtual view of the target subject. For example, the view parameters may pertain to a desired novel view (e.g., a novel synthesized image pertaining to a novel (e.g., virtual) view previously uncaptured by cameras). The view parameters may include target parameters for a witness camera capturing content at substantially the same time as the color images 136 and the depth images 138, for example. The view parameters may include predefined lens parameters, viewing directions, poses, and particular intrinsic and/or extrinsic parameters of a camera configured to capture the novel view.

At block 608, the process 600 may include generating a plurality of warped images based on the plurality of input images, the plurality of view parameters, and at least one of the plurality of depth images. For example, the image warp engine 220 may generate warped images using the input images 132 by re-projecting the input images 132 into reprojected versions of said images 132. The warping may be performed to determine a projection of the input colors of the input images 132 into a novel view using the depth information (e.g., either the individual depth images or a geometric consensus surface). The warping may generate reprojected images (e.g., images 404) by obtaining a color from one or more original input views and manipulating the colors for a novel view (e.g., image) using depth images (e.g., depth maps 406 and occlusion maps 408). Each input image may be used to generate a separate reprojection. The reprojected images (e.g., images 404) may represent pixels of candidate colors that may be used in a novel synthesized image.

In some implementations, the process 600 may include generating the plurality of warped images based on the plurality of input images, the plurality of view parameters, and at least one of the plurality of depth images by determining candidate projections of colors associated with the plurality of input images 402 into an uncaptured view (i.e., a novel view/image, virtual view/image) using the at least one of the plurality of depth images (e.g., depth maps 406 and occlusion maps 408). The uncaptured view may include at least a portion of image features of at least one of the plurality of input images. For example, if the input images include an object, the uncaptured view may account for at least a portion, a color, a pixel, etc. of the object.

At block 610, the process 600 may include receiving, from a neural network (e.g., NN 224, NN 414, NN 508A-C) blending weights 416 for assigning color to pixels of the virtual view (e.g., an unseen image/uncaptured view) of the target subject (e.g., user 104'). In some implementations, the target subject may include or be based on at least one element captured in at least one frame the plurality of input images 402. The blending weights 416 may be received in response to providing the plurality of depth images (e.g., depth images 138 and/or depth maps 406 and/or occlusion maps 408), the plurality of view parameters 415, and the plurality of warped images (e.g., reprojected images 404) to the NN 414. The NN 414 may generate blending weights 416 to indicate a probabilistic way of combining the colors of the reprojected images 404 to provide a likely and realistic output image that is realistically representative of the target subject. In some implementations, the blending weights 416 are configured to assign a blended color to each pixel of a virtual view (i.e., a novel and/or unseen and/or previously uncaptured view) resulting in an assignment of such blended colors to an output synthesized image (e.g., synthesized image 422). For example, the blending weights 416 are used for blending at least portions of the reprojected images 404 with one another.

At block 612, the process 600 may include generating, based on the blending weights and the virtual view a synthesized image according to the view parameters. The synthesized image 422 may represent an image captured using parameters pertaining to an uncaptured view (e.g., uncaptured by physical cameras, generated as a virtual view from a virtual or physical camera, etc.), which may represent a view that is unseen (e.g., not captured by any cameras of the image system, but instead synthesized. The synthesized image 422 may be generated for and/or during a three-dimensional (e.g., telepresence) video conference. For example, the synthesized image 422 may be generated in real time during a video conference to provide error corrected and accurate images of a user or content being captured by cameras associated with the video conference. In some implementations, the synthesized image 422 represents a novel view generated for a three-dimensional video conference. In some implementations, the synthesized image represents an uncaptured view of the target subject generated for a three-dimensional video conference.

In operation, the blending weights are applied to pixels in the virtual view according to the view parameters. The resulting virtual view may include pixel colors generated using the blended weights for the target subject. The colorized image of the virtual view may be used to generate the synthesized view according to the view parameters associated with a virtual camera, for example.

In some implementations, the process 600 may additionally perform geometric fusion processes. In some implementations, the process 600 may perform the geometric fusion processes instead of providing the individual depth images with the input images. For example, the process 600 may reconstruct a consensus surface (e.g., a geometric proxy) using a geometric fusion process on the plurality of depth images to generate a geometrically fused model.

The geometrically fused model may be used to replace multiple views of depth image data (e.g., captured depth views of image content) with updated (e.g., calculated) views of depth image data. The updated depth views may be generated as views of the image content that contain the depth data from the captured depth views and additionally contain image and/or depth information from each of any other available captured depth views of the image content. One or more of the updated depth views may be used by NN 414, for example, to synthesize additional (and new) blending weights to synthesize additional (and new) views of the object by utilizing the geometrically fused depth image data and image and/or depth information associated with multiple other views of the object. The depth image data may be fused using any number of algorithms to replace each (input) depth view by a new depth view that incorporates depth data information from several other depth views. In some implementations, the geometrically fused model can be used by system 200 to generate depth data (e.g., depth maps) that may be used to reason about occlusions in order to correct for such occlusion losses.

The process 600 may then generate a plurality of reprojected images based on plurality of input images and the consensus surface used to generate the geometrically fused depth image data and provide the geometrically fused depth image data to the NN 414 (along with the plurality of view parameters 415 and the plurality of reprojected images 404). In response, the process 600 may include receiving, from the NN 414, blending weights 416 and/or additional blending weights generated using the consensus surface depth image data for assigning color to pixels in the synthesized image 422.

In some implementations, the process 600 may further include providing, to the NN 414, a difference in depth between the geometrically fused model and a depth observed in the plurality of depth images. The difference of depth may be used to correct for detected occlusions in the synthesized image 422, for example. In some implementations, the NN 414 may be trained based on minimizing an occlusion loss function between the synthesized image generated by the NN 414 and a ground truth image 412 captured by at least one witness camera (associated with system 202A, for example), as described in detail with respect to FIG. 4. In some implementations, the process 400 may be carried out using a single depth image, rather than a plurality of depth images.

In some implementations, the NN 414 is further configured to perform multiresolution blending to assign pixel color to pixels in a synthesized image. In operation, the multiresolution blending may trigger provision of image pyramids as input to the NN 414 to trigger receiving, from the NN 414, multiresolution blending weights (e.g., additional blending weights 520) for a plurality of scales and may additionally receive an opacity value associated with each scale.

Figure 7:
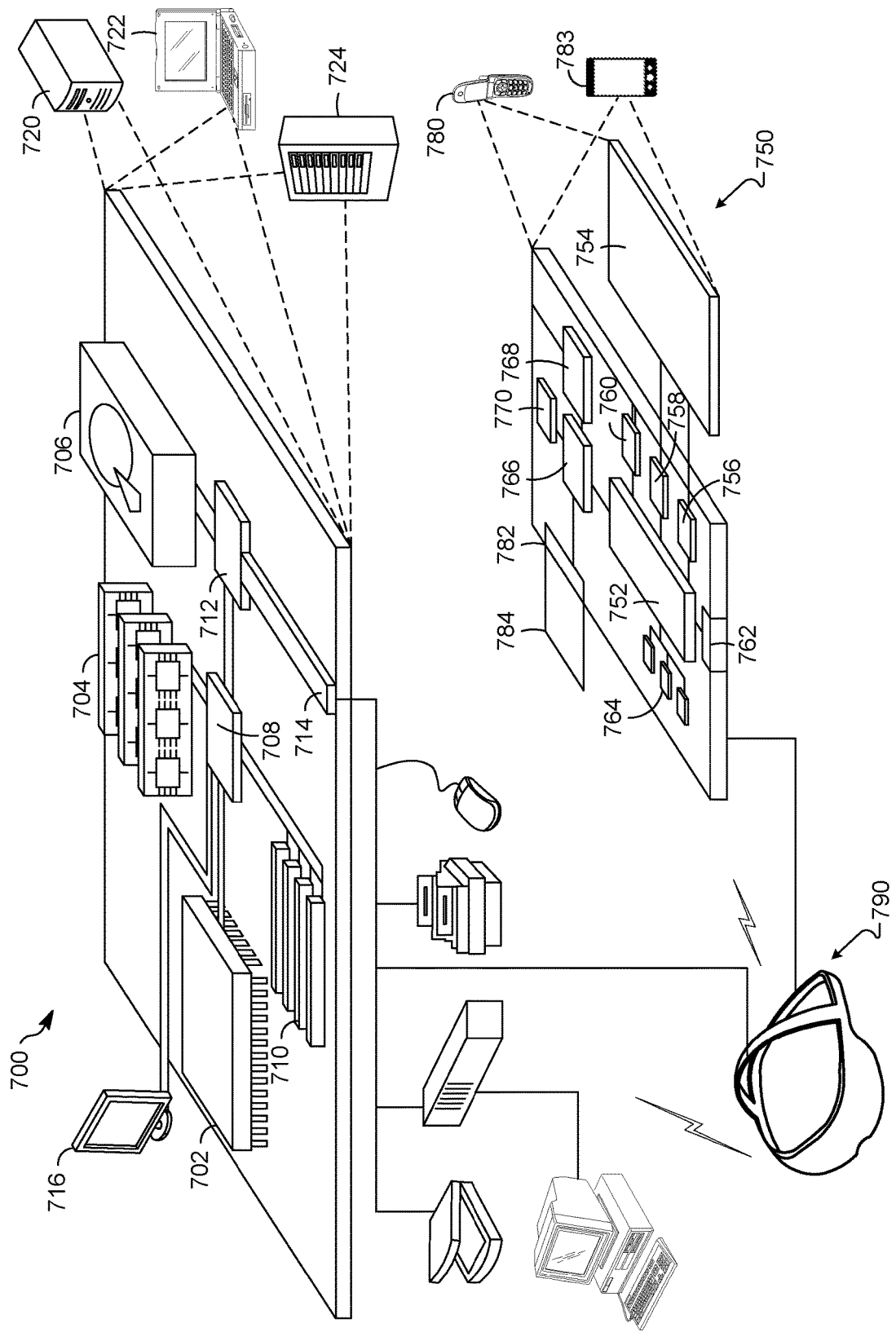
FIG. 7 shows an example of a computer device and a mobile computer device, which may be used with the techniques described herein.

FIG. 7 shows an example of a computer device 700 and a mobile computer device 750, which may be used with the described techniques. Computing device 700 can include a processor 702, memory 704, a storage device 706, a high-speed interface 708 connecting to memory 704 and high-speed expansion ports 710, and a low speed interface 712 connecting to low speed bus 714 and storage device 706. Components 702, 704, 706, 708, 710, and 712, are interconnected using various busses, and can be mounted on a common motherboard or in other manners as appropriate. Processor 702 can process instructions for execution within the computing device 700, including instructions stored in the memory 704 or on storage device 706 to display graphical information for a GUI on an external input/output device, such as display 716 coupled to high speed interface 708. In some embodiments, multiple processors and/or multiple buses can be used, as appropriate, along with multiple memories and types of memory. In addition, multiple computing devices 700 can be connected, with each device providing portions of the necessary operations (e.g., as a server bank, a group of blade servers, or a multi-processor system).

Memory 704 stores information within computing device 700. In one embodiment, memory 704 is a volatile memory unit or units. In another embodiment, memory 704 is a non-volatile memory unit or units. Memory 704 may also be another form of computer-readable medium, such as a magnetic or optical disk.

Storage device 706 can provide mass storage for the computing device 700. In one embodiment, storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 704, storage device 706, or memory on processor 702.

High speed controller 708 manages bandwidth-intensive operations for computing device 700, while low speed controller 712 manages lower bandwidth-intensive operations. Such allocation of functions is exemplary only. In one embodiment, high-speed controller 708 is coupled to memory 704, display 716 (e.g., through a graphics processor or accelerator), and to high-speed expansion ports 710, which may accept various expansion cards (not shown). Low-speed controller 712 can be coupled to storage device 706 and low-speed expansion port 714. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices may contain one or more of computing devices 700, 750, and an entire system may be made up of multiple computing devices 700, 750 communicating with each other.

Computing device 750 includes processor 752, memory 764, an input/output device such as display 754, communication interface 766, and transceiver 768, among other components. Device 750 may also be provided with a storage device, such as a microdrive or other device, to provide additional storage. Each of components 750, 752, 764, 754, 766, and 768, are interconnected using various buses, and several of the components may be mounted on a common motherboard or in other manners as appropriate.

Processor 752 can execute instructions within the computing device 750, including instructions stored in memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to display 754. Display 754 may be, for example, a TFT LCD (Thin-Film-Transistor Liquid Crystal Display) or an OLED (Organic Light Emitting Diode) display, or other appropriate display technology. Display interface 756 may comprise appropriate circuitry for driving display 754 to present graphical and other information to a user. Control interface 758 may receive commands from a user and convert them for submission to processor 752. In addition, external interface 762 may communicate with processor 752, so as to enable near area communication of device 750 with other devices. External interface 762 can provide, for example, for wired or wireless communication in some embodiments multiple interfaces can be used.

Memory 764 stores information within computing device 750. Memory 764 can be implemented as one or more of a computer-readable medium or media, a volatile memory unit or units, or a non-volatile memory unit or units. Expansion memory 784 may also be provided and connected to device 750 through expansion interface 782, which may include, for example, a SIMM (Single In Line Memory Module) card interface. Such expansion memory 784 may provide extra storage space for device 750, or may also store applications or other information for device 750. Specifically, expansion memory 784 may include instructions to carry out or supplement the processes described above, and may include secure information also. Thus, for example, expansion memory 784 can be a security module for device 750, and can be programmed with instructions that permit secure use of device 750. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 764, expansion memory 784, or memory on processor 752 that may be received, for example, over transceiver 768 or external interface 762.

Device 750 can communicate wirelessly through communication interface 766, which can include digital signal processing circuitry where necessary. Communication interface 766 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 768. In addition, short-range communication can occur, such as using a Bluetooth, Wi-Fi, or other such transceiver (not shown). In addition, GPS (Global Positioning System) receiver module 770 can provide additional navigation- and location-related wireless data to device 750, which can be used as appropriate by applications running on device 750.

Device 750 can also communicate audibly using audio codec 760, which may receive spoken information from a user and convert it to usable digital information. Audio codec 760 may likewise generate audible sounds for a user, such as through a speaker, e.g., in a handset of device 750. Such sound can include sound from voice telephone calls, can include recorded sound (e.g., voice messages, music files, etc.) and can also include sound generated by applications operating on device 750.

Computing device 750 can be implemented in a number of different forms, as shown in the figure. For example, it can be implemented as cellular telephone 780. It can also be implemented as part of smart phone 783, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 7 can include sensors that interface with a virtual reality headset (VR headset/HMD device 790). For example, one or more sensors included on computing device 750 or other computing device depicted in FIG. 7, can provide input to VR headset 790 or in general, provide input to a VR space. The sensors can include, but are not limited to, a touchscreen, accelerometers, gyroscopes, pressure sensors, biometric sensors, temperature sensors, humidity sensors, and ambient light sensors. Computing device 750 can use the sensors to determine an absolute position and/or a detected rotation of the computing device in the VR space that can then be used as input to the VR space. For example, computing device 750 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some embodiments, one or more input devices included on, or connected to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some embodiments, one or more output devices included on the computing device 750 can provide output and/or feedback to a user of the VR headset 790 in the VR space. The output and feedback can be visual, tactical, or audio. The output and/or feedback can include, but is not limited to, rendering the VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 750 can be placed within VR headset 790 to create a VR system. VR headset 790 can include one or more positioning elements that allow for the placement of computing device 750, such as smart phone 783, in the appropriate position within VR headset 790. In such embodiments, the display of smart phone 783 can render stereoscopic images representing the VR space or virtual environment.

In some embodiments, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the VR space. As just one example, a computing device can be a laser pointer. In such an example, computing device 750 appears as a virtual laser pointer in the computer-generated, 3D environment. As the user manipulates computing device 750, the user in the VR space sees movement of the laser pointer. The user receives feedback from interactions with the computing device 750 in the VR environment on the computing device 750 or on the VR headset 790.

In some embodiments, a computing device 750 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving a plurality of depth images associated with a target subject in at least one of a plurality of input images;
   receiving a plurality of view parameters for generating a virtual view of the target subject;
   generating a plurality of warped images based on the plurality of input images, the plurality of view parameters, and at least one of the plurality of depth images;
   in response to providing the plurality of depth images, the plurality of view parameters, and the plurality of warped images to a neural network, receiving, from the neural network, at least one blending weight for assigning color to pixels of the virtual view of the target subject;
   generating, based on the at least one blending weight and the virtual view, a synthesized image according to the plurality of view parameters; and
   correcting for detected occlusions in the synthesized image based on a difference in depth between a geometrically fused model and a depth observed in the plurality of depth images.

2. The computer-implemented method of claim 1, further comprising:
   reconstructing a consensus surface using a geometric fusion process on the plurality of depth images to generate the geometrically fused model;
   generating a plurality of reprojected images based on the plurality of input images and the consensus surface; and
   in response to providing the plurality of depth images, the plurality of view parameters, and the plurality of reprojected images to the neural network, receiving, from the neural network, additional blending weights for assigning the color to pixels in the synthesized image.

3. The computer-implemented method of claim 1, wherein:
   the plurality of input images are color images captured according to predefined view parameters associated with at least one camera that captured the plurality of input images; and/or
   the plurality of depth images each including a depth map associated with at least one camera that captured at least one of the plurality of input images, at least one occlusion map, and/or a depth map associated with a ground truth image captured by at least one witness camera at a time corresponding to capture of at least one of the plurality of input images.

4. The computer-implemented method of claim 1, wherein the at least one blending weight is configured to assign a blended color to each pixel of the synthesized image.

5. The computer-implemented method of claim 1, wherein the neural network is trained based on minimizing an occlusion loss function between the synthesized image generated by the neural network and a ground truth image captured by at least one witness camera.

6. The computer-implemented method of claim 1, wherein the synthesized image is an uncaptured view of the target subject generated for a three-dimensional video conference.

7. The computer-implemented method of claim 1, wherein generating the plurality of warped images based on the plurality of input images, the plurality of view parameters, and at least one of the plurality of depth images includes determining candidate projections of colors associated with the plurality of input images into an uncaptured view using the at least one of the plurality of depth images, the uncaptured view including at least a portion of image features of at least one of the plurality of input images.

8. An image processing system for executing the computer-implemented method as claimed in claim 1, the image processing system comprising:

at least one processing device; and a memory storing instructions that when executed cause the image processing system to perform operations including:

receiving a plurality of depth images captured by the image processing system;

receiving a plurality of view parameters associated with an uncaptured view associated with at least one of a plurality of input images captured by the image processing system;

generating a plurality of warped images based on the plurality of input images, the plurality of view parameters, and at least one of the plurality of depth images;

in response to providing the plurality of depth images, the plurality of view parameters, and the plurality of warped images to a neural network, receiving, from the neural network, at least one blending weight for assigning color to pixels of the uncaptured view;

generating a synthesized image according to the at least one blending weight, wherein the synthesized image corresponds to the uncaptured view; and correcting for detected occlusions in the synthesized image based on a difference in depth between a geometrically fused model and a depth observed in the plurality of depth images.

9. The image processing system of claim 8, wherein:

the plurality of input images are color images captured by the image processing system according to predefined view parameters associated with the image processing system; and/or the plurality of depth images including a depth map associated with at least one camera that captured at least one of the plurality of input images, at least one occlusion map, and/or a depth map associated with a witness camera of the image processing system.

10. The image processing system of claim 8, wherein the at least one blending weight is configured to assign a blended color to each pixel of the synthesized image.

11. The image processing system of claim 8, wherein the neural network is trained based on minimizing an occlusion loss function between the synthesized image generated by the neural network and a ground truth image captured by at least one witness camera.

12. The image processing system of claim 8, wherein the synthesized image is a novel view generated for a three-dimensional video conference.

13. A non-transitory, machine-readable medium having instructions stored thereon, the instructions, when executed by a processor, cause a computing device to:

receive a plurality of depth images associated with a target subject in at least one of a plurality of input images;

receive a plurality of view parameters for generating a virtual view of the target subject;

reconstructing a consensus surface using a geometric fusion process on the plurality of depth images to generate a geometrically fused model of the target subject;

generating a plurality of reprojected images based on the plurality of input images, the plurality of view parameters, and the consensus surface;

in response to providing the plurality of depth images, the plurality of view parameters, and the plurality of reprojected images to a neural network, receiving, from the neural network, at least one blending weight for assigning color to pixels to the virtual view of the target subject;

generating, based on the at least one blending weight and the virtual view, a synthesized image according to the plurality of view parameters; and correcting for detected occlusions in the synthesized image based on a difference in depth between the geometrically fused model and a depth observed in the plurality of depth images.

14. The non-transitory, machine-readable medium of claim 13, wherein:

the plurality of input images are color images captured according to predefined view parameters associated with at least one camera that captured the plurality of input images; and/or the plurality of depth images include a depth map associated with at least one camera that captured at least one of the plurality of input images, at least one occlusion map, and/or a depth map associated with a ground truth image captured by at least one witness camera at a time corresponding to capture of at least one of the plurality of input images.

15. The non-transitory, machine-readable medium of claim 13, wherein the at least one blending weight is configured to assign a blended color to each pixel of the synthesized image.

16. The non-transitory, machine-readable medium of claim 13, wherein the neural network is trained based on minimizing an occlusion loss function between the synthesized image generated by the neural network and a ground truth image captured by at least one witness camera.

17. The non-transitory, machine-readable medium of claim 13, wherein the synthesized image is a novel view for a three-dimensional video conference.

18. The non-transitory, machine-readable medium of claim 13, wherein the neural network is further configured to perform multiresolution blending to assign pixel color to pixels in the synthesized image, a multiresolution blending triggering provision of image pyramids as input to the neural network to trigger receiving, from the neural network, multiresolution blending weights for a plurality of scales and an opacity value associated with each scale.

* * * * *